INVENTORS
Hubert A. Riester, Frederick L. Maltby
and Ernest L. Weber
BY
Albert J. Henderson
THEIR ATTORNEY INVENTORS
Hubert A. Riester, Frederick L. Maltby
and Ernest L. Weber.
BY Albert J. Henderson
THEIR ATTORNEY INVENTORS
Hubert A. Riester, Frederick L. Maltby
and Ernest L. Weber.
BY
Albert J. Henderson
THEIR ATTORNEY

RECORDING MECHANISM

Filed April 19, 1955 9 Sheets-Sheet 4

INVENTORS
Hubert A. Riester, Frederick L. Maltby
and Ernest L. Weber.
BY
Albert J. Henderson
THEIR ATTORNEY July 25, 1961 F. L. MALTBY ET AL 2,993,741

RECORDING MECHANISM

Filed April 19, 1955 9 Sheets-Sheet 5

July 25, 1961 F. L. MALTBY ET AL 2,993,741
RECORDING MECHANISM
Filed April 19, 1955 9 Sheets-Sheet 6
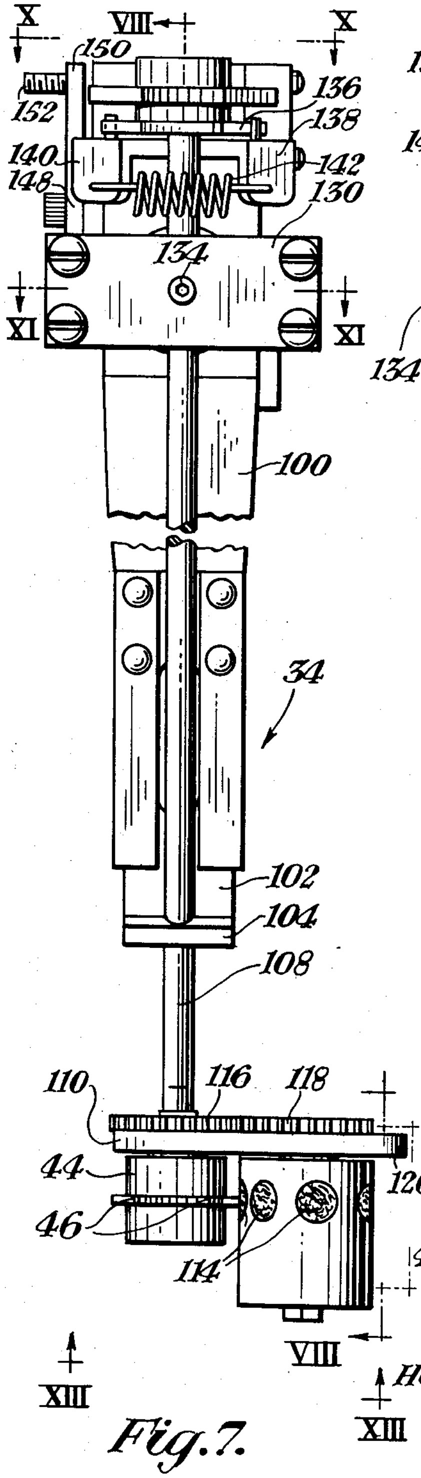
Fig.7.
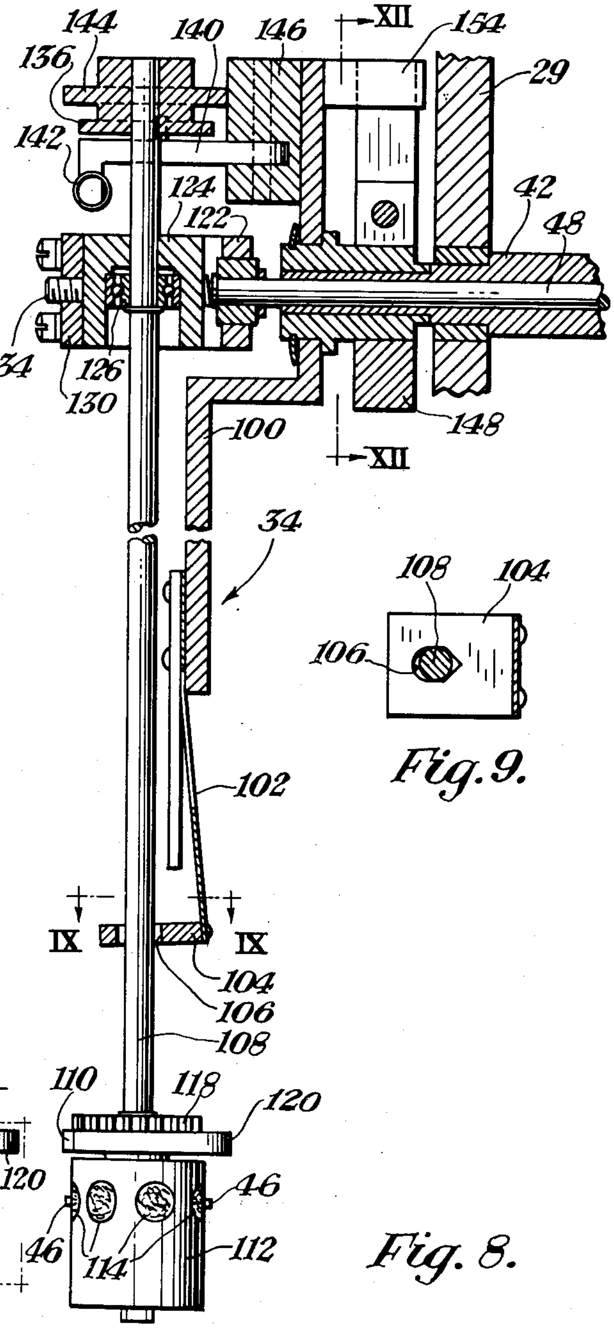
Fig. 8.
Fig. 9.
INVENTORS
Hubert A. Riester, Frederick L. Maltby
and Ernest L. Weber.
BY
Albert J. Henderson
THEIR ATTORNEY INVENTORS
Hubert A. Riester, Frederick
L. Maltby and Ernest L. Weber
BY
Albert J. Henderson
THEIR ATTORNEY July 25, 1961 F. L. MALTBY ET AL 2,993,741

RECORDING MECHANISM

Filed April 19, 1955 9 Sheets-Sheet 8

INVENTORS

*Hubert A. Riester, Frederick L. Maltby and Ernest L. Weber.*

BY *Albert J. Henderson*

THEIR ATTORNEY

RECORDING MECHANISM

Filed April 19, 1955 9 Sheets-Sheet 9

INVENTORS
Hubert A. Riester, Frederick
L. Maltby and Ernest L. Weber.
BY
Albert J. Henderson
THEIR ATTORNEY

2,993,741
RECORDING MECHANISM

Frederick L. Maltby, Abington, and Ernest L. Weber and Hubert A. Riester, Huntingdon Valley, Pa., assignors to Robertshaw-Fulton Controls Company, Richmond, Va., a corporation of Delaware Filed Apr. 19, 1955, Ser. No. 502,484
14 Claims. (Cl. 346—34)

This invention relates to recorders for producing records of variable conditions and particularly to multi-record recorders of the type used to record, on a single chart, the values of a number of different variables.

Multi-record recorders have the advantage of taking the place of a plurality of recorders thereby saving substantial space and reducing the cost of instrumentation. It is a principal object of this invention to enhance the advantages of multi-record recorders by increasing the number of records which may be printed on a single chart.

Another object of this invention is to increase the number of records which may be printed upon a circular chart by printing a plurality of groups of records sequentially on a plurality of chart segments. In a preferred embodiment of the invention, this is effected by moving the printing mechanism through a series of printing cycles and moving the chart through a selected angle at the end of each series.

Another object of this invention is to enable a plurality of records to be printed on selected segments of a circular chart by driving the chart at a uniform rate of rotation and sequentially superimposing on such rotation, uniform increments of rotational movement. In a preferred embodiment of the invention, this action is accomplished by connecting a motor for the uniform drive and a motor for the segmental drive to the chart through a differential gearing.

Another object of this invention is to increase the speed with which a plurality of records may be printed on a single chart.

Another object of the invention is to record the value of a first variable while a scanning system is being conditioned to measure and record the value of a second variable. In a preferred embodiment of the invention, multiple banks of selector switches are respectively connected to a plurality of devices for sequentially measuring the value of the variables to be recorded and the banks are alternately connected to the printing mechanism.

One conventional type of multi-record, round-chart instrument employs a single pen arm mounted for angular movement in a plane parallel to the chart to position a turret type pen in recording positions corresponding respectively with the values of variable conditions which are to be recorded. The pin arm is reciprocable along an axis normal to the plane of the chart and a ratchet mechanism indexes the printing head in response to such reciprocable movement. A disadvantage in this type of mechanism is that the printing head often contacts the chart before the indexing operation is completed to produce an inaccurate or blurred record. It is an object of this invention to overcome this disadvantage and assure positive orientation of the printing head prior to the printing operation. To this end, in the present invention, the mechanism for indexing the printing head and the mechanism for performing the actual printing have common parts which must be in a definite relationship to effect printing.

Another object of this invention is to prevent contact between the printing mechanism and the chart until the printing mechanism is correctly oriented.

Another object of this invention is to simplify adjustment of the printing pressure in a reciprocable printing mechanism.

Another object of this invention is to simplify the zero adjustment of a recorder pen arm.

Another object of this invention is to assure positive inking of a plurality of pens carried on a rotatable turret positionable over a chart to various recording positions. In a preferred embodiment of the invention, an inking turret is geared to the pin turret to be positively rotated into successive engagement with the various pens upon rotation of the pen turret.

Other objects and advantages will appear from the following specification taken in connection with the accompanying drawings wherein:

FIG. 7 is a fragmentary sectional view taken on the line VII—VII of FIG. 2 and showing, on an enlarged scale, the pen mechanism of the recorder of FIG. 2;

FIG. 8 is a sectional view taken on the line VIII—VIII of FIG. 7;

FIG. 9 is a sectional view taken on the line IX—IX of FIG. 8 and shown on a slightly enlarged scale;

Figure 1:
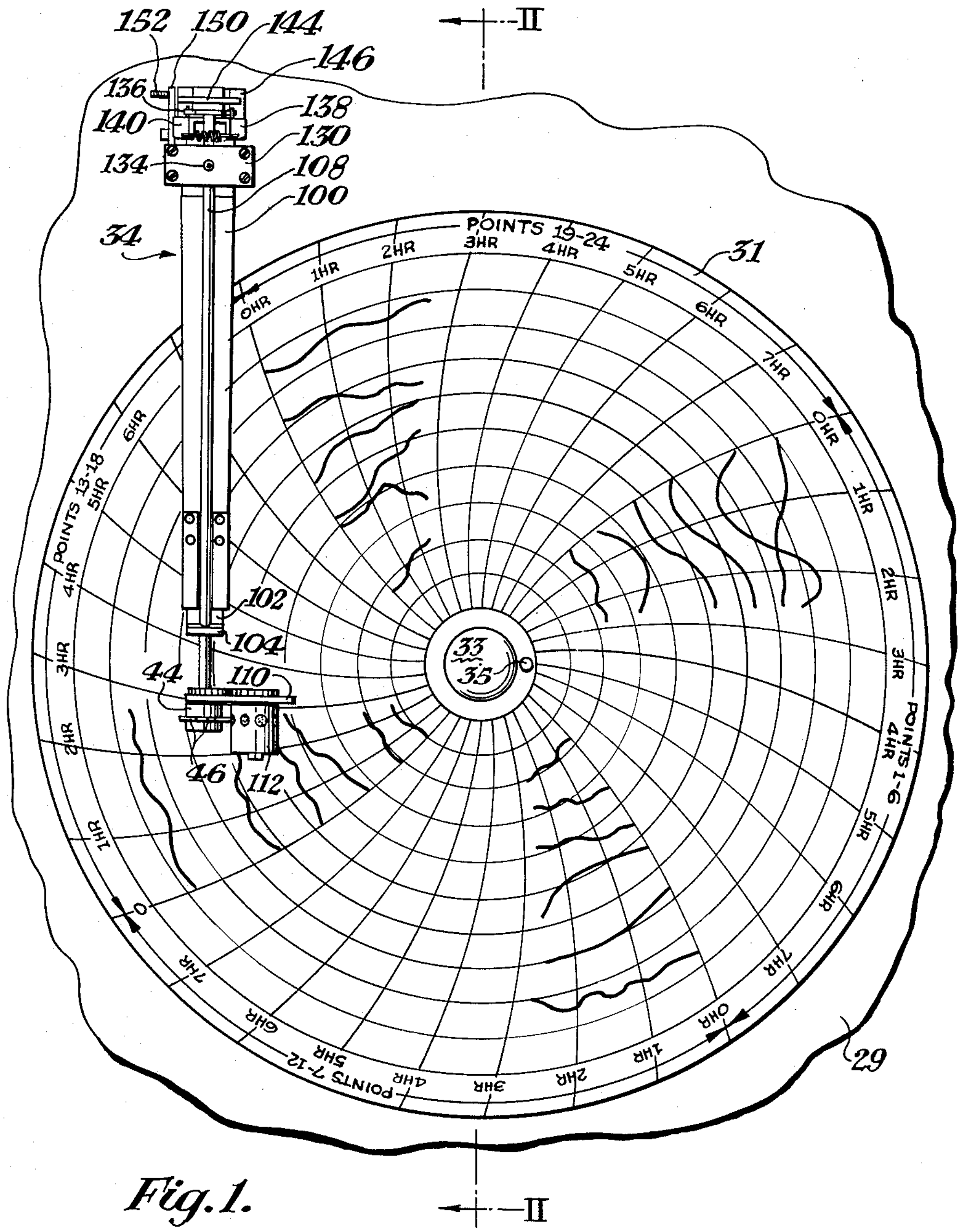
FIG. 1 is a fragmentary front elevation of a multi-record round-chart recorder embodying the invention.
Figure 2:
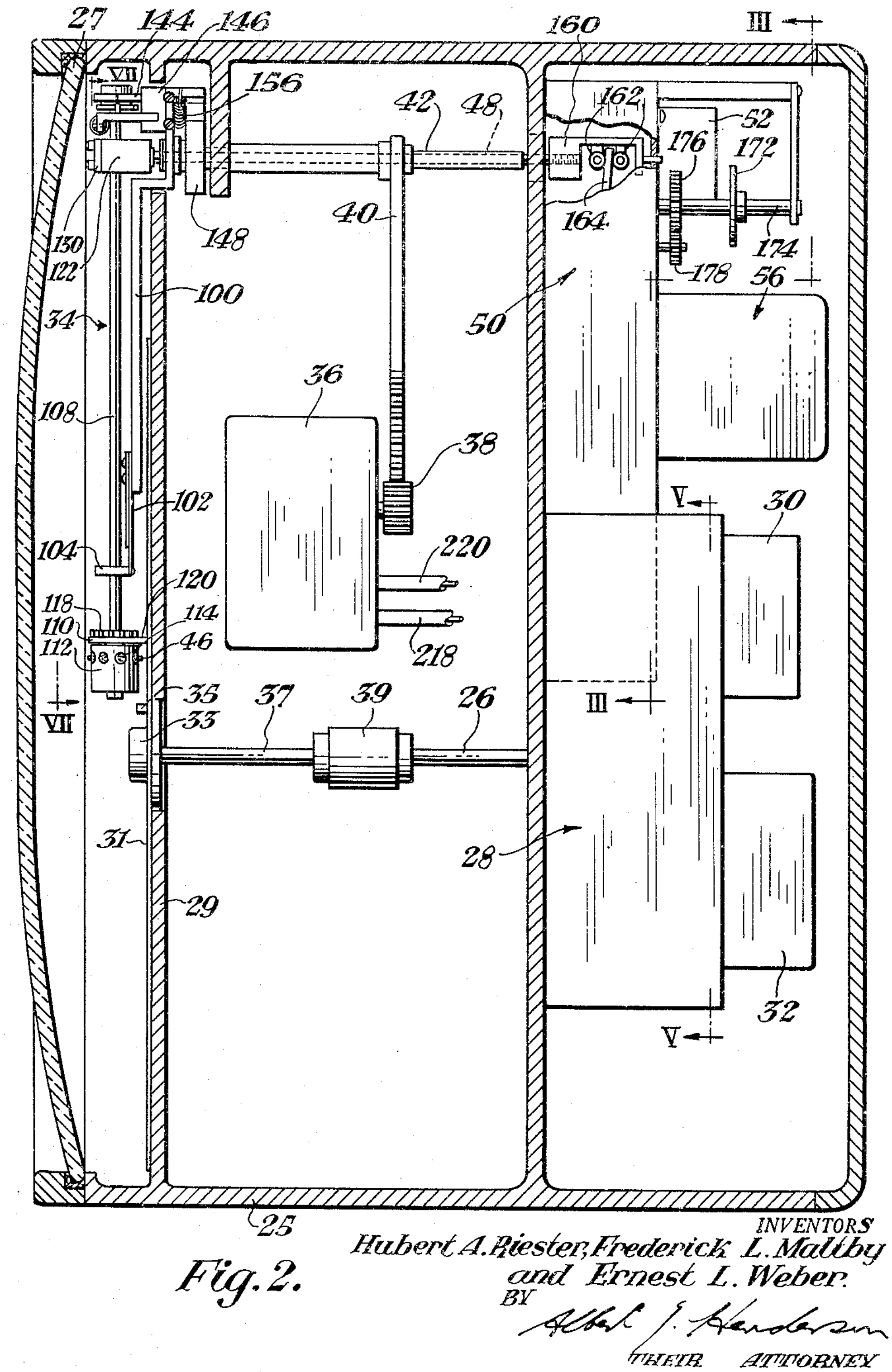
FIG. 2 is a full sectional view of a recorder embodying this invention and corresponding to a section taken on the line II—II of FIG. 1.
Figure 4:
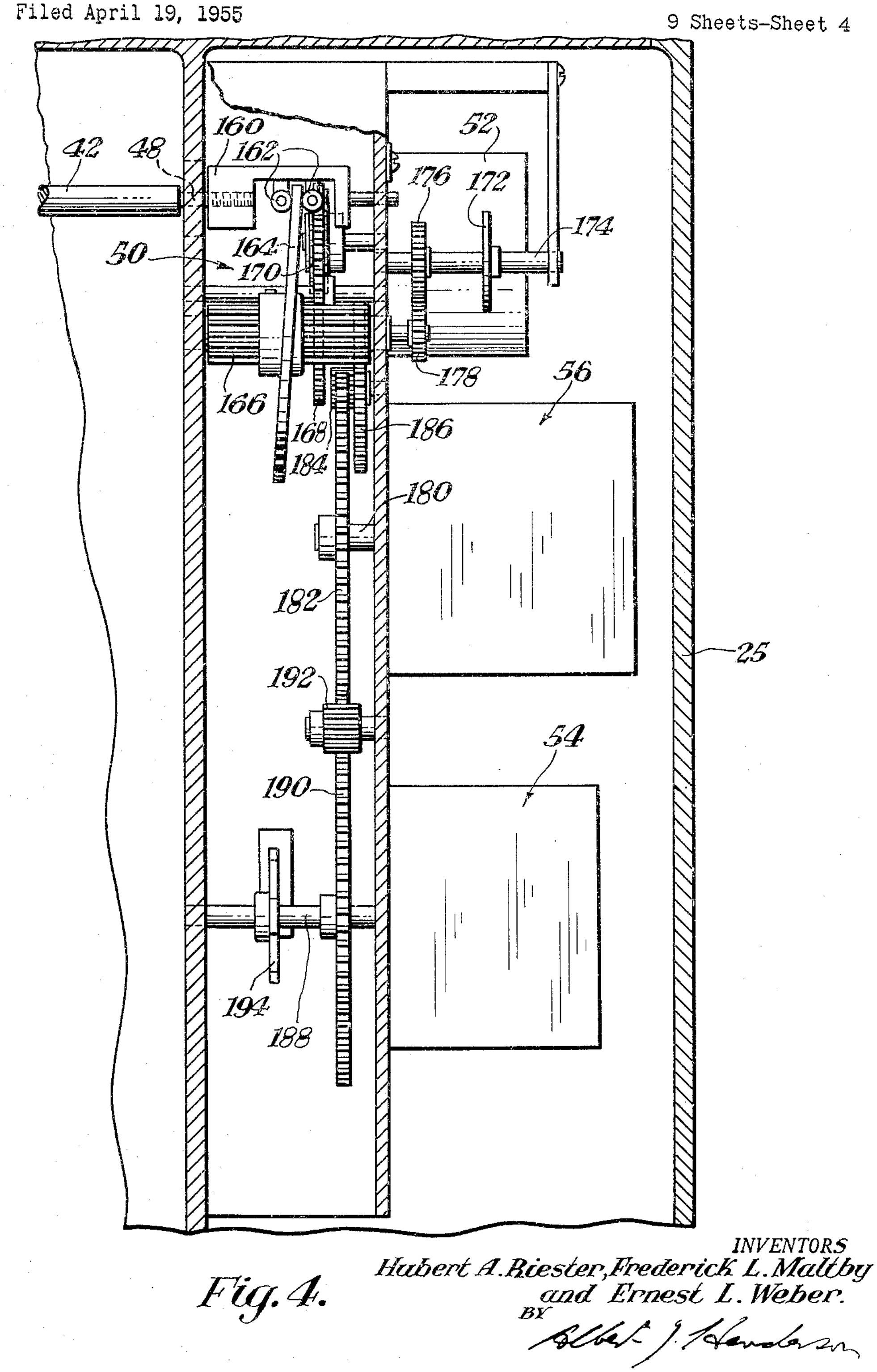
FIG. 4 is a sectional view taken on the line IV—IV of FIG. 3.
Figure 6:
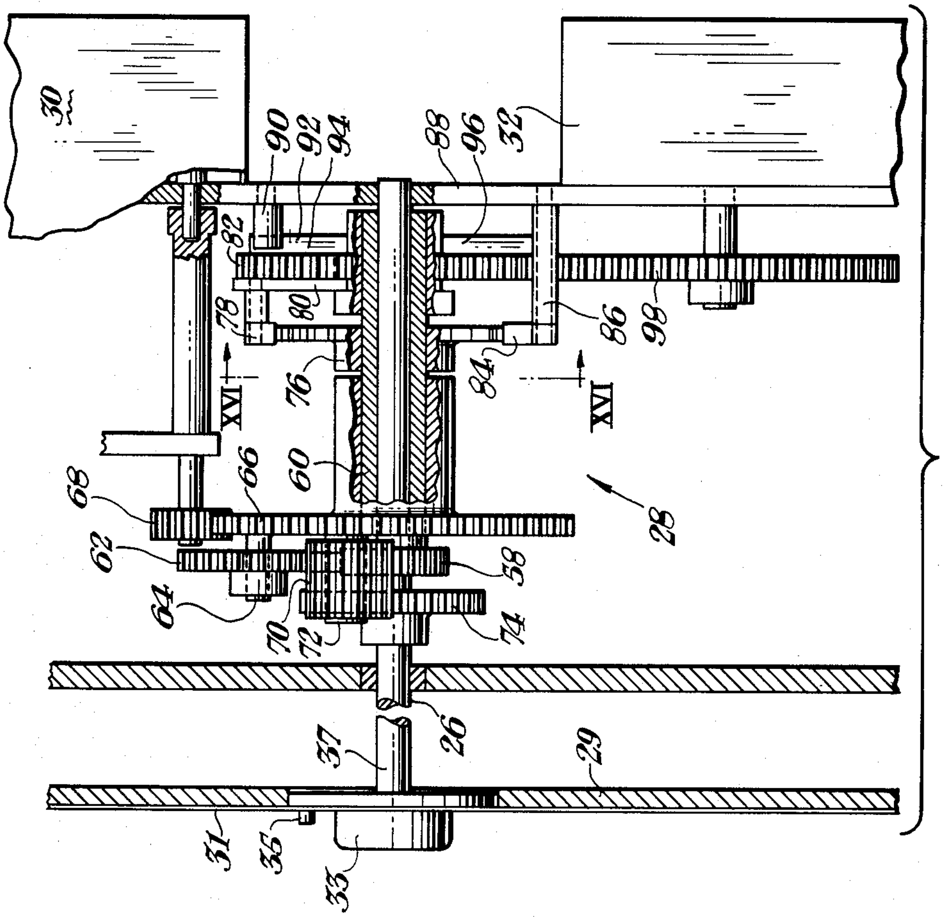
FIG. 6 is a sectional view taken on the line VI—VI of FIG. 5 with portions thereof broken away.

Referring more particularly to FIGS. 1, 2 and 4 of the drawings, a multi-record recorder is here shown as comprising a case 25 having an open end closed by a glass door 27. Extending across the interior of the casing 25 and positioned immediately behind the glass door 27 is a partition 29 which serves as a support for a circular chart 31. A conventional spindle or hub 33 engages the chart 31 at its central portion and carries a pin 35 which extends through a suitable aperture formed in the chart 31 to establish a driving connection between the hub 33 and the chart 31 in a manner well known in the art. The hub 33 is connected by means of a shaft 37, flexible coupling 39, and shaft 26 to a differential gearing indicated generally by the reference numeral 28. Power is supplied to the differential gearing 28 from a constantly energized, constant speed motor 30 and a constantly energized periodically operated, reversible, segmental drive motor 32.

As will more fully appear hereinafter, the differential gearing 28 and control system for the motor 32 are such that the chart 31 is driven at a uniform rate of rotation by the constant speed motor 30 while the periodically energized motor 32 drives the chart 31 through selected increments of angular movement at selected intervals of time.

A printing mechanism or pen arm, indicated generally by the reference numeral 34, is mounted between the door 27 and the partition 29 for angular movement in a plane parallel to the plane of the chart 31 and is successively positionable over the chart 31 to recording positions corresponding respectively with the values of variable conditions which are to be recorded. The pen arm 34 is moved to its various recording positions by an actuating device 36 which includes a pinion 38 rotatable in response to signals produced by suitable measuring means responsive to the various conditions, the values of which are to be recorded. The pinion 38 meshes with a quadrant gear 40 carried by an arbor 42 journaled on the casing 25. The arbor 42 is connected to the pen arm 34 to impart angular movement thereto upon rotation of the pinion 38 and angular movement of the quadrant gear 40.

The pen arm 34 carries a marking turret 44 from which a plurality, in this instance six, of pens 46 extend. The pens 46 are adapted to be brought sequentially into registry with the chart 31 by rotational indexing of the marking turret 44. The pen arm 34 is adapted to effect such indexing upon reciprocation thereof along the axis of the arbor 42.

Reciprocable movement of the pen arm 34 is effected through reciprocation of a shaft 48 slidably mounted in the arbor 42 and pivotally connected at one end to the pen arm 34. The other end of the shaft 48 is connected to means for reciprocating the same which is indicated generally by the reference numeral 50.

The reciprocating means 50 includes a constant speed motor 52 which is also operatively connected to a pair of bank selector switches 54, 56 adapted to sequentially connect various means, responsive to the conditions to be recorded, to the pen arm actuating device 36 as will more fully appear hereinafter.

The differential gearing 28 which connects the constantly energized motor 30 and the periodically energized motor 32 to the chart driving spindle 33 is best shown in FIGS. 5, 6, 15 and 16 and is here shown as comprising a planetary gear train. The planetary gearing includes a sun gear 58 mounted for rotation with an arbor 60 which is journaled on the chart driving shaft 26. A first planet gear 62 meshes with the sun gear 58 and is mounted for rotation on a pintle 64 which extends laterally from a gear wheel 66. The gear wheel 66 is rotatably mounted on the arbor 60 and meshes with a pinion 68 which is driven by the constantly energized constant speed motor 30.

A second planet gear 70 meshes with the first planet gear 62 and is rotatably mounted on a pintle 72 extending laterally from the gear wheel 66. The planet gear 70 is relatively long and extends axially beyond the planet gear 62 to mesh with a gear wheel 74 mounted on the shaft 26 to rotate therewith.

In operation, the motor 30 drives the pinion 68 at a constant rate to rotate the gear wheel 66 about the arbor 60 and cause the planet gears 62, 70 to revolve about the sun gear 58. Since the planet gear 62 meshes with the sun gear 58, the former will be rotated about the pintle 64 as it revolves about the sun gear 58. Rotation of the planet gear 62 in turn causes rotation of the planet gear 70 about the pintle 72 to cause rotation of the gear wheel 74 which in turn drives the chart driving shaft 26 at a uniform angular velocity.

Adjacent the gear wheel 66, is a ratchet wheel 76 which is mounted on the arbor 60 to rotate therewith. A first pawl 78 engages the ratchet wheel 76 and is mounted on a plate 80 which is secured to a gear wheel 82 rotatably mounted on the arbor 60. A second pawl 84 engages the ratchet wheel 76 and is carried by a support 86 extending from a partition 88 formed in the casing 25.

Rotation of the gear wheel 82 is limited to a predetermined angular distance, here shown as 180°, by the provision of a stop 90 mounted on the partition 88 and extending toward the gear wheel 82 for engagement by an abutment plate 92. The abutment plate 92 is secured to the gear wheel 82 for rotation therewith and is substantially semi-circular in form to provide a pair of radially extending surfaces 94, 96. The surfaces 94, 96 are respectively engageable with opposite sides of the stop 90 to accurately limit the angular displacement of the gear wheel 82. The gear wheel 82 is driven by the segmental drive motor 32 by means of a gear wheel 98 which is connected to the output shaft of the motor 32 and meshes with the gear wheel 82.

In the present embodiment, the motor 32 is reversible and is adapted to drive the gear wheel 82 in either direction until the stop 90 is engaged by one of the surfaces 94, 96 to prevent further rotation of the gear 82 and stall the motor 32. The pawls 78, 84 are disposed relative to the ratchet wheel 76 to permit rotation thereof in one direction only. Thus rotation of the gear wheel 82 in one direction will cause the pawl 78 to drive the ratchet wheel 76 through a selected angular distance while rotation of the gear wheel 82 in the other direction will reposition the pawl 78 for the beginning of a subsequent driving operation. During such repositioning, the ratchet wheel 76 is held stationary by the pawl 84.

In FIGS. 5, 6, 15, and 16, the assembly of the gear wheel 82, plate 92, and pawl 78 is shown in the position which it occupies at the end of a driving operation with the surface 94 of the plate 92 abutting the stop 90. After the apparatus has assumed this position, control means for the motor 32, to be described more fully hereinafter, conditions the motor 32 to drive the gear wheel 98 in a counterclockwise direction, as viewed in FIGS. 5 and 15, to cause the gear wheel 82 and plate 92 to rotate in a clockwise direction until the surface 96 on the plate 92 abuts the stop 90. Such rotation of the gear wheel 82 moves the pawl 78 in a clockwise direction about the periphery of the ratchet wheel 76 to position the same for the beginning of another driving operation.

Figure 5:
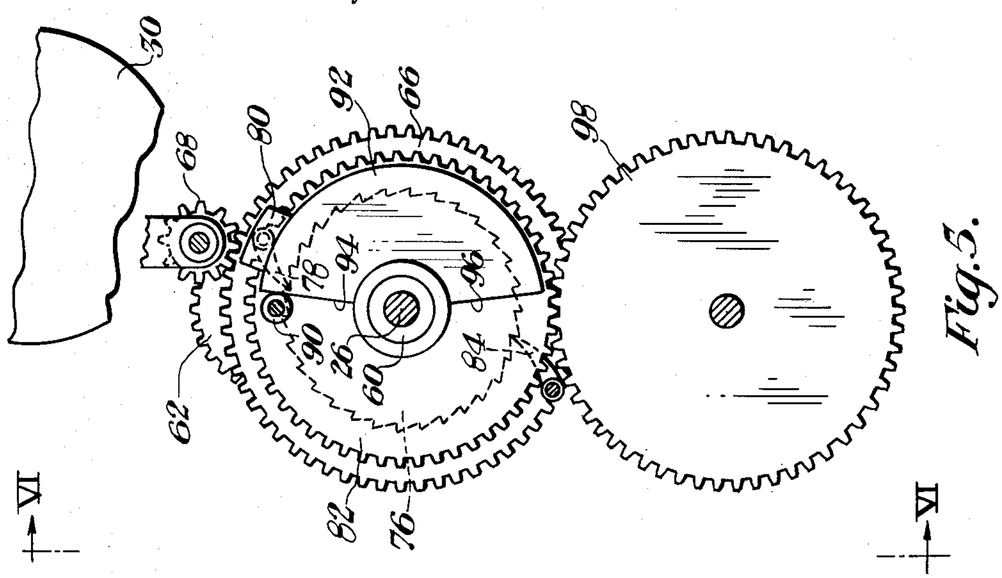
FIG. 5 is a fragmentary sectional view taken on the line V—V of FIG. 2 and shown on an enlarged scale.
Figure 15:
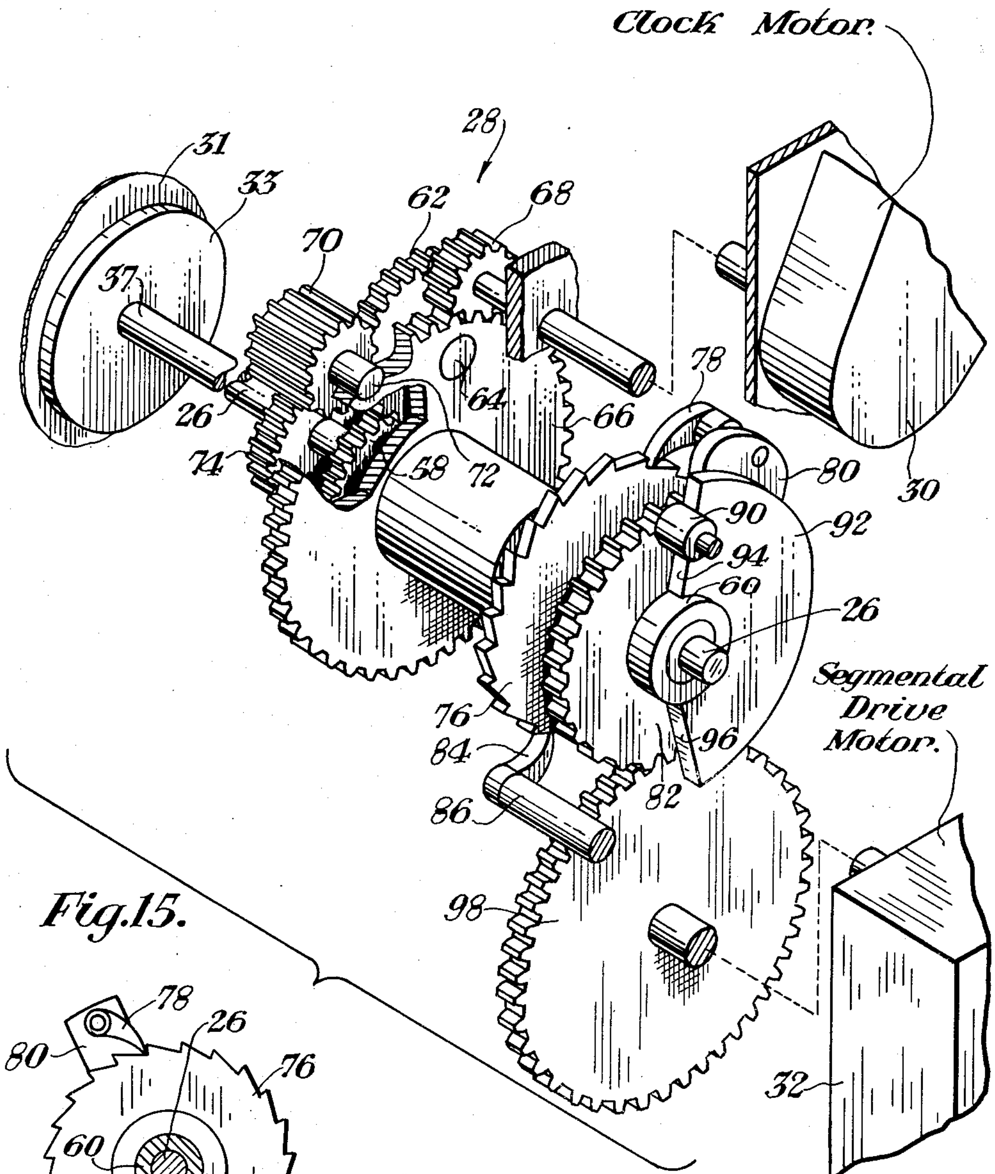
FIG. 15 is a perspective view of differential gearing for driving the chart of the recorder shown in FIGS. 1 and 2.
Figure 16:
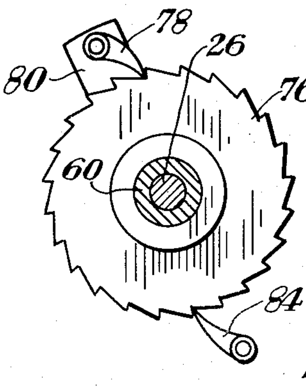
FIG. 16 is a fragmentary sectional view taken on the line XVI—XVI of FIG. 6.

Subsequently, the control means for the motor 32 conditions the same to rotate the gear wheel 98 in a clockwise direction, as viewed in FIGS. 5 and 15, to cause the gear wheel 82 to rotate in a counterclockwise direction until the surface 94 on the plate 92 abuts the stop 90. Such rotation of the gear wheel 82 causes the pawl 78 to drive the ratchet wheel 76 in a counterclockwise direction. Since the ratchet wheel 76 is secured to the arbor 60, rotation of the ratchet wheel 76 will effect a corresponding rotation of the sun gear 58 with consequent rotation of the planet gear 62, planet gear 70, and gear wheel 74 to drive the chart driving shaft 26 through a selected angular distance. In the embodiment of the invention herein disclosed, the gear ratio between the gear wheel 82 and the gear wheel 74 is 2:1 so that the above described 180° rotation of the gear wheel 82 will produce 90° rotation of the gear wheel 74 and chart driving shaft 26 for a purpose which will more fully appear hereinafter.

It is to be noted that the above described 90° displacement of the chart driving shaft 26 and chart 31 is superimposed upon the displacement thereof which is occurring at a uniform rate as a result of the hereinbefore described connection between the constantly energized motor 30 and the shaft 26, and the chart 31 is at all times connected to and under the control of the motor 30. This results from the fact that the motor 30 continues to cause the planet gear 62 to revolve about the sun gear 58 even while the motor 32 is driving the sun gear 58 to impart a 90° increment of movement to the chart 31.

As best shown in FIGS. 7 through 13, the pen arm assembly 34 includes a lever arm 100 which is pivotally mounted intermediate its ends on the arbor 42 for swinging movement in a plane parallel to the chart 31. Secured to one end of the lever arm 100 is a leaf spring 102 which has a guide element 104 secured to the free end thereof. The guide element 104 is provided with an aperture 106, one wall of which is V-shaped with the apex thereof disposed in a plane extending normal to the chart 31 and passing through the center line of the lever arm 100. The aperture 106 is adapted to receive and accurately position a medial portion of a pen actuating shaft 108 to which is juxtaposed the lever arm 100.

The end of the pen actuating shaft 108 which extends beyond the guide element 104 carries the marking turret 44 and is adapted to rotate therewith. A bracket 110 is pivotally mounted on the shaft 108 immediately adjacent the marking turret 44 and an inking turret 112 is carried by the bracket 110 for pivotal movement about an axis parallel to the axis of the shaft 108. The inking turret 112 includes a plurality, in this instance six, of inking pads 114 which are angularly spaced from each other and adapted to engage the pens 46 respectively upon rotation of the marking turret 44 and inking turret 112. Each of the inking pads 114 is saturated with a different colored ink to enable each of the pens 46 to produce a distinctive record.

Means is provided for rotating the inking turret 112 in response to rotation of the marking turret 44 and is here shown as comprising a first gear 116 rotatable with the shaft 108 and meshing with a second gear 118 rotatable with the inking turret 112. The bracket 110 includes a projection 120 which is adapted to extend into engagement with the chart 31 to prevent rotation of the bracket 110 upon rotation of the shaft 108. Thus, rotation of the shaft 108 to bring one of the pens 46 into registry with the chart 31 will cause rotation of the gears 116, 118. Rotation of the gear 118 will rotate the inking turret 112 to move one of the inking pads 114 into engagement with one of the pens 46 which is positioned for subsequent movement into registry with the chart 31.

The pen actuating shaft 108 is connected to the reciprocable shaft 48 at a point intermediate its ends by means of a yoke 122 pivotally mounted on the end of the shaft 48 and having a bearing block 124 slidably mounted therein. The bearing block 124 carries a self-aligning bearing 126 in which the shaft 108 is journaled. A pair of guide pins 128 carried by the yoke 122 extend slidably into suitable apertures formed in the bearing block 124 to retain the same within the yoke 122. The bearing block 124 is biased toward a cover plate 130 on the yoke 122 by a pair of springs 132 acting between the block 124 and the yoke 122. A set screw 134 is threaded through the cover plate 130 and abuts the bearing block 124 to adjust the position of the block 124 within the yoke 122 for a purpose which will more fully appear hereinafter.

Since the shaft 48 is reciprocable, the connection between the same and the yoke 122 is effective to impart an oscillating movement to the pen actuating shaft 108 in a plane normal to the chart 31 and means is provided for utilizing such oscillation to effect rotary indexing of the pen actuating shaft 108 to move the pens 46 sequentially into registry with the chart 31. This means takes the form of a ratchet mechanism operatively associated with that end of the pen actuating shaft 108 opposite the end which carries the marking turret 44.

The ratchet mechanism comprises a ratchet wheel 136 secured to the pen actuating shaft 108 and a pair of pawls 138, 140 pivoted on the lever arm 100 to be engageable with the ratchet wheel 136. The pawls 138, 140 are disposed on either side of the ratchet wheel 136 and extend therebeyond for engagement with a spring 142 which serves to bias the pawls 138, 140 toward each other and into engagement with the ratchet wheel 136. The arrangement of the pawls 138, 140 and the ratchet wheel 136 is such that movement of the pen actuating shaft 108 and ratchet wheel 136 away from the chart 31 causes the pawl 138 to impart a first increment of angular movement to the ratchet wheel 136 and shaft 108. Return movement of the shaft 108 and ratchet wheel 136 toward the chart 31 causes the ratchet wheel 136 to engage the pawl 140 and produce a second increment of angular movement. These two increments of angular movement produce a total angular movement in a single oscillation of the shaft 108 sufficient to move one of the pens 46 out of registry with the chart 31 and another pen 46 into registry therewith. It is to be noted that, since one half the indexing movement takes place as the pen actuating shaft 108 moves away from the chart and one half of the indexing movement takes place as the pen actuating shaft 108 moves toward the chart, the overall distance through which the pen actuating shaft 108 must be displaced to effect the indexing operation is relatively small.

Formed integral with the ratchet wheel 136 is an indexing plate 144 which is generally polygonal in shape, the number of sides thereof corresponding to the number of pens 46 on the printing turret 44, in this instance six. The indexing plate 144 is engageable with an anvil 146 secured to that end of the lever arm 100 which is opposite the end carrying the leaf spring 102. The indexing plate 144 is oriented on the shaft 108 relative to the printing turret 44 in such a manner that one of the pens 46 is disposed normal to the chart 31 when a corresponding side of the indexing plate 144 is seated on the anvil 146.

In operation, each cycle of the shaft 48, consisting of movement thereof out of the arbor 42 and back into the same, is effective to index the printing turret 44 and thereafter move one of the pens 46 into printing engagement with the chart 31. More particularly, if the various parts of the apparatus are positioned as shown in FIGS. 7 through 10, the shaft 48 is moving out of the arbor 42 to move the yoke 122, bearing 126 and shaft 108 carried thereby away from the chart 31. This movement causes the pawl 138, in cooperation with the ratchet wheel 136, to move one of the pens 46 out of printing position and move another one of the pens 46 toward printing position.

When the shaft 48 reaches its outer limit and then moves back into the arbor 42, the ratchet wheel 136 is moved into engagement with the pawl 140 to complete the indexing operation and complete movement of the aforementioned other pen 46 into printing position. Upon completion of the indexing operation, one side of the indexing plate 144 is positioned for engagement with the anvil 146 and moves into engagement therewith as the shaft 48 continues to move into the arbor 42. At this point, indexing of the marking turret 44 is complete, however, the leaf spring 102 is acting to maintain the marking turret 44 out of printing engagement with the chart 31. Accordingly, additional movement of the shaft 48 into the arbor 42 is required to effect printing. The printing operation occurs when the shaft 48 acts to pivot the pen actuating arm 108 about the indexing plate 144 which is seated on the anvil 146. It will thus be apparent that the leaf spring 102 acts to maintain the pens 46 out of engagement with the chart 31 until the indexing operation is completed since the bias of the spring 102 cannot be overcome until the indexing plate 144 is seated on the anvil 146 to provide a pivot point and, at the same time, accurately orient the pens 46 of the printing turret 44.

Preferably, the bearing block 124 is positioned in the yoke 122 to assure a slight flexing of the pen actuating arm 108 at the end of the inward stroke of the shaft 48 after one of the pens has engaged the chart 31 to assure the application of a positive printing pressure to the pen. Accordingly, since the set screw 134 is effective to position the bearing block 124 axially of the shaft 48, it will also be effective to adjust the degree of flexing of the pen actuating arm 108 during actual printing and thus adjust the printing pressure. It is to be noted that the arrangement disclosed has the particular advantage of permitting adjustment of the pressure exerted by a pen on the chart 31 by the simple manipulation of a single screw accessible from the front of the instrument.

Figure 10:
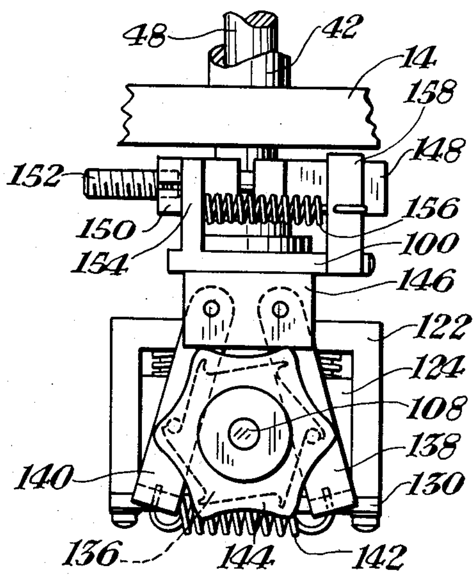
FIG. 10 is an end view of the pen mechanism shown in FIG. 7 and is taken along the line X—X thereof.
Figure 12:
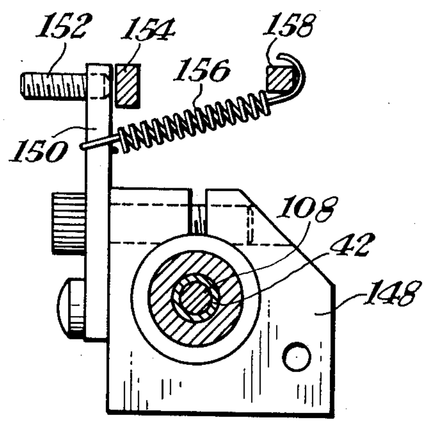
FIG. 12 is a sectional view taken on the line XII—XII of FIG. 8.
Figure 11:
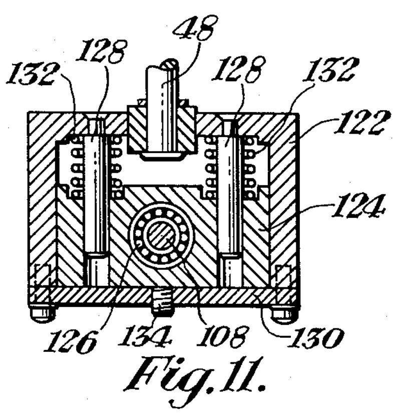
FIG. 11 is a sectional view taken on the line XI—XI of FIG. 7.
Figure 13:
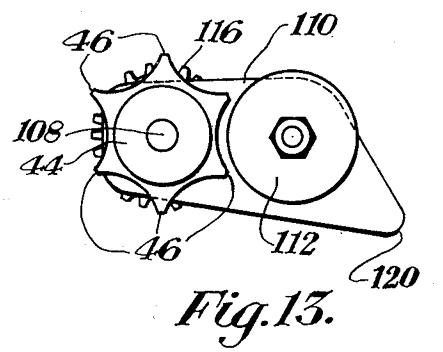
FIG. 13 is an end view of the pen mechanism shown in FIG. 7 and is taken along the line XIII—XIII thereof.
Figure 14:
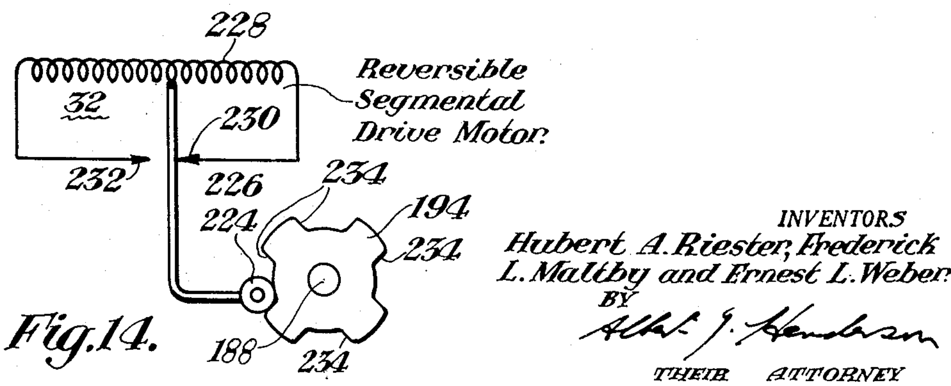
FIG. 14 is a schematic showing of a portion of the control system of the recorder shown in FIG. 2.

Means is provided for establishing a torque transmitting connection between the arbor 42 and the lever arm 100 of the pen arm assembly 34 to enable the printing turret 44 to be positioned in various recording positions relative to the chart 31 in response to operation of the pen arm actuating device 36. This means is best shown in FIGS. 8, 10 and 12 and comprises a clamp 148 secured to the arbor 42 and provided with a laterally extending arm 150. An adjusting screw 152 is threaded through the arm 150 for engagement with a lug 154 projecting from the lever arm 100 immediately opposite the anvil 146. A spring 156 acts between the arm 150 and a second lug 158 formed on the lever arm 100 to bias the adjusting screw 152 into engagement with the lug 154. Thus, torque is transmitted from the arbor 42 to the lever arm 100 through the clamp 148, arm 150, adjusting screw 152 and lug 154 and the lever arm 100 will follow angular movements of the arbor 42.

Since the adjusting screw 152 abuts the lug 154 carried by the lever arm 100, it will be apparent that manipulation of the adjusting screw 152 will be effective to adjust the angular relation between the clamp 148 and the lever arm 100 and thus adjust the angular relation between the pen arm assembly 34 and the arbor 42. This provides a simple zero adjustment for the instrument.

The spring 156 also facilitates the changing of a chart 31 as it will yield to permit the pen arm assembly 34 to be swung out of superimposed relation with the chart. This swinging movement would be clockwise as viewed in FIG. 1.

Figure 3:
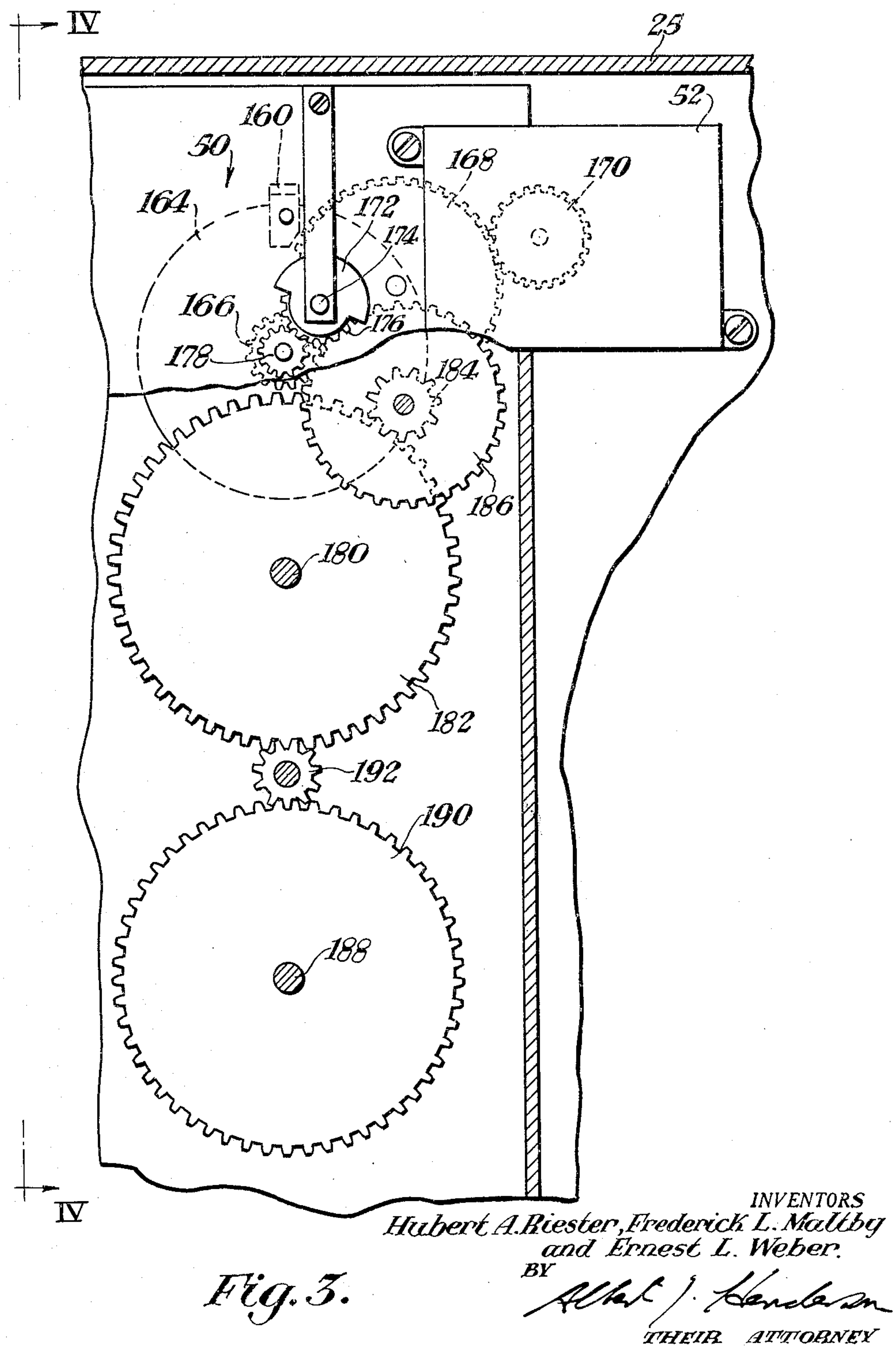
FIG. 3 is a fragmentary sectional view taken on the line III—III of FIG. 2 and shown on an enlarged scale.

The mechanism 50 for reciprocating the shaft 48 and effecting the hereinbefore described indexing and printing operation of the pen arm assembly 34 is best shown in FIGS. 3 and 4. This mechanism comprises a crosshead 160 secured to the end of the shaft 48 and carrying a pair of spaced rollers 162. The rollers 162 abut opposite sides of a swash plate 164 which is mounted for rotation with a pinion 166. The pinion 166 meshes with a gear wheel 168 which in turn meshes with a gear wheel 170 driven by the constant speed motor 52. Thus, the swash plate 164 is driven at a uniform rate by the motor 52 to effect periodic reciprocation of the shaft 48.

The constant speed motor 52 also drives the bank selector switches 54, 56 and a bank selector switch actuating cam 172. The cam 172 is secured to a rotatable shaft 174 which also carries a gear 176 meshing with a pinion 178 rotatable with the swash plate pinion 166.

A rotatable shaft 180 extends from the bank selector switch 56 and carries a gear wheel 182 which meshes with a pinion 184. The pinion 184 is rotatable with a gear wheel 186 which meshes with the swash plate pinion 166. Accordingly the shaft 180 is connected to the constant speed motor 52 through gears 170, 168, 166, 186, 184 and 182.

A rotatable shaft 188 extends from the bank selector switch 54 and carries a gear wheel 190 which is connected to the gear wheel 182 through an idler gear 192. Rotatable with the shaft 188 is a cam 194 which controls energization of the reversible segmental drive motor 32 as will more fully appear hereinafter.

Figure 17:
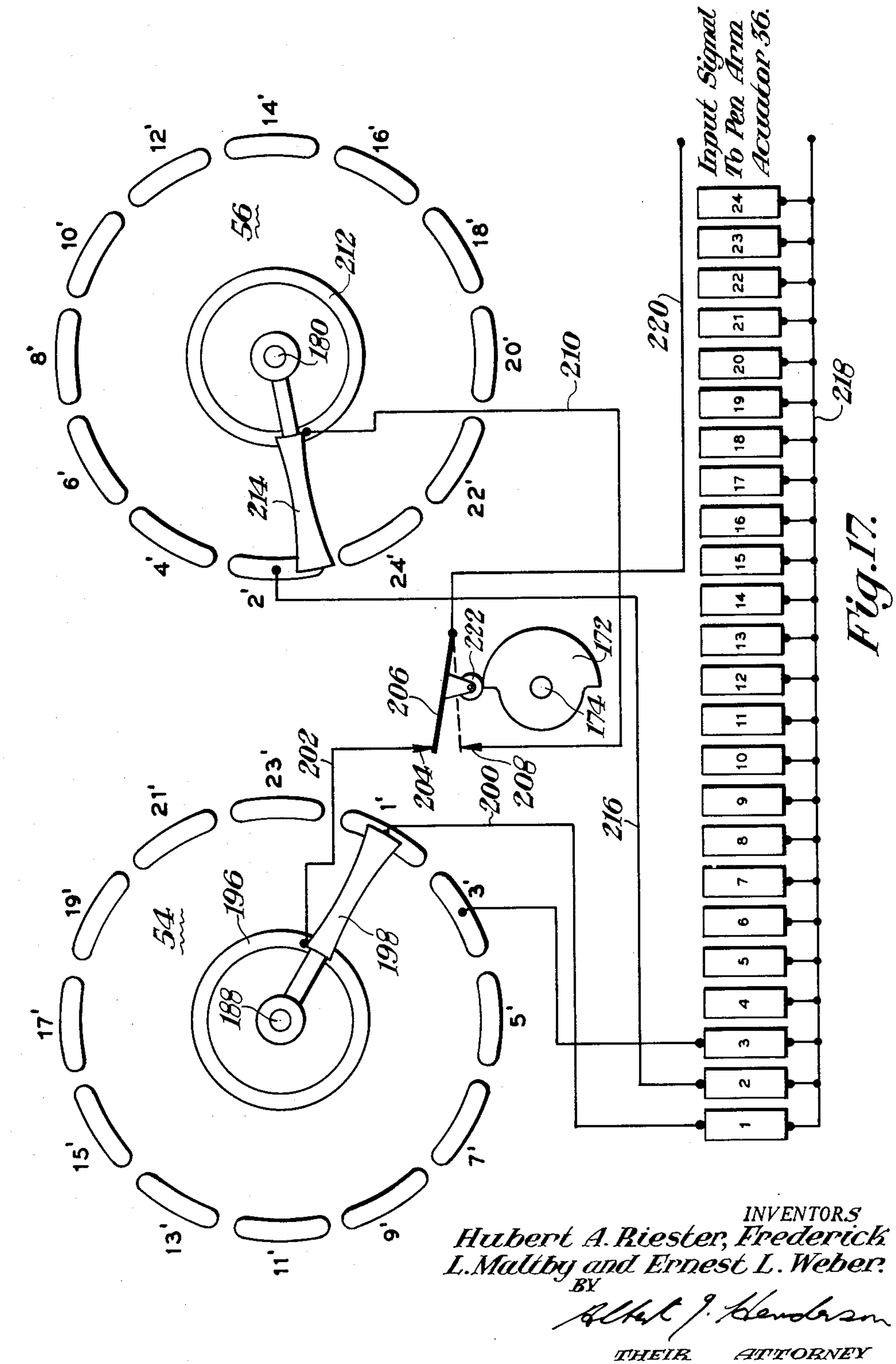
FIG. 17 is a schematic showing of a portion of the control system of the recorder shown in FIG. 2.

As shown schematically in FIGURE 17, the bank selector switches 54, 56 are connected to a plurality of devices adapted to produce a signal in response to various conditions the values of which are to be recorded. The condition responsive devices are indicated by the reference numerals 1 through 24 and may be considered to be thermocouples each of which is adapted to produce a voltage, variable in accordance with variations in a temperature condition.

The selector switch 54 includes an outer contact ring made up of a plurality (in this instance 12) of spaced contacts 1′, 3′, 5′, 7′, 9′, 11′, 13′, 15′, 17′, 19′, 21′, and 23′. An annular contact ring 196 is positioned radially inward of the contacts 1′–23′ and encompasses the rotatable shaft 188. Rotatable with the shaft 188 is a movable contact 198 which engages the contact ring 196 at all times and which is sequentially engageable with the contacts 1′–23′ upon rotation of the shaft 188. The contacts 1′, 3′, 5′, 7′, 9′, 11′, 13′, 15′, 17′, 19′, 21′ and 23′ are conected respectively to thermocouples 1, 3, 5, 7, 9, 11, 13, 15, 17, 19, 21 and 23 by suitable wires 200, only two of which are shown for the sake of clarity. The contact ring 196 is connected by a wire 202 to a contact 204 of a double throw switch which includes a switch arm 206 and a second contact 208.

The contact 208 is connected by a wire 210 to an annular contact ring 212 which encompasses the shaft 180 of the switch 56. The switch 56 also includes a contact ring disposed radially outward of the contact ring 212 and made up of a plurality (in this instance 12) of spaced contacts 2′, 4′, 6′, 8′, 10′, 12′, 14′, 16′, 18′, 20′, 22′, and 24′. A movable contact 214 continuously engages the contact ring 212 and is rotatable with the shaft 180 to sequentially engage the contacts 2′–24′. The contacts 2′, 4′, 6′, 8′, 10′, 12′, 14′, 16′, 18′, 20′, 22′ and 24′ are respectively connected to the thermocouples 2, 4, 6, 8, 10, 12, 14, 16, 18, 20, 22, 24 by a plurality of wires 216, only one of which is shown for the sake of clarity.

Each of the thermocouples 1–24 is also connected to a wire 218 which is connected to the pen arm actuator 36. The pen arm actuator 36 is also connected by a wire 220 to the switch arm 206. Thus the wires 218, 220 serve to sequentially feed the signals produced by the thermocouples 1–24 to the pen arm actuator 36 as the selector switches 54, 56 scan the thermocouples.

When the parts of the apparatus are in the positions shown in FIG. 17, thermocouple 1 is connected to the pen arm actuator 36 through a circuit which may be traced as follows: from thermocouple 1, through one of the wires 200, contact 1′, movable contact 198, contact ring 196, wire 202, contact 204, switch arm 206, wire 220, pen arm actuator 36, and wire 218 to thermocouple 1. The signal generated by the thermocouple 1 is thus fed to the arm actuator 36 to cause the same to actuate the pinion 38 and quadrant gear 40 and thereby position the pen arm assembly 34 in an angular position corresponding to the value of the voltage produced by the thermocouple 1 and indicating the temperature sensed by the thermocouple 1. Simultaneously, the mechanism 50 for reciprocating the shaft 48 is moving the pen arm assembly 34 to complete the hereinbefore described pen indexing and printing operations.

The switch arm 206 normaly engages the contact 208 and carries a cam follower 222 which engages the cam 172 for periodically moving the switch arm 206 into engagement with the contact 204. The configuration of the cam 172 is such that the switch arm 206 alternately engages the contacts 204, 208 during sequential printing cycles of the pen arm assembly 34. It will be apparent that, since the cam 172 is driven by the motor 52 which also reciprocates the pen arm assembly 34, the relationship between movements of the switch arm 206 and the pen arm assembly 34 remains constant.

It will also be apparent that, since the constant speed motor 52 also drives the movable contacts 198, 214 of the selector switches 54, 56, the scanning operation of the contacts 198, 214 will, at all times, remain in a predetermined relationship to the indexing and printing operations of the pen arm 34. Thus, upon completion of the above described printing operation which records the value sensed by the thermocouple 1, the movable contact 198 is approaching the end of contact 1′ and the movable contact 214 is fully engaged with the contact 2′.

At this point, the cam 172 permits the switch arm 206 to move into engagement with the contact 208 to connect the thermocouple 2 to the pen arm actuator 36 through a circuit which may be traced as follows: from the thermocouple 2, through one of the wires 216, contact 2′, movable contact 214, contact wing 212, wire 210, contact 208, switch arm 206, wire 220, pen arm actuator 36, and wire 218 to thermocouple 2. Thus, the signal generated by the thermocouple 2 is fed to the pen arm actuator 36 causing the same to position the pen arm assembly 34 in an angular position corresponding to the voltage produced by the thermocouple 2 and indicating the value of the temperature sensed by the thermocouple 2. The pen arm assembly 34, of course, moves to the angular position corresponding to the signal received from the thermocouple 2 before the pen indexing operation is completed and before one of the pens 46 is moved into engagement with the chart.

Upon completion of the second printing operation, the movable switch arm 198 will have moved into engagement with the contact 3′ and, when the cam 172 moves the switch arm 206 into engagement with the contact 204, the apparatus is conditioned to feed the voltage generated by the thermocouple 3 to the pen arm actuator 36. The switching operation then continues in substantially the same manner as described in connection with contacts 1′ and 2′ with the contacts 1′ through 24′ being sequentially connected to the pen arm actuator 36 as the movable contacts 198, 214 sequentially engage the same and the switch arm 206 alternately connects the movable contacts 198, 214 with the pen arm actuator 36.

With the disclosed arrangement of multiple banks of contacts connected to selected condition responsive means and having the selector switch arm 206 sequentially connecting the banks to the pen arm actuator, the pen arm actuator is connected in circuit with only one condition responsive means at any given time. Accordingly, the pen arm actuator 36 at no time attempts to position the pen arm assembly 34 in an angular position corresponding to an average signal value produced by two or more of the condition responsive devices. Preferably, the configuration of the cam 172 is such that the switch arm 206 is moved rapidly between the contacts 204, 208 so that angular movement of the pen arm assembly 34 is confined to movement between positions corresponding to values which are to be recorded. Thus, the time which elapses between printing operations may be maintained at a minimum and a large number of condition responsive means may be scanned with the values of their respective conditions being recorded in a minimum period of time.

The control system for the reversible segmental drive drive motor 32 includes the cam 194 which is rotatable with the shaft 188 of the selector switch 56. The cam 194 engages a cam follower 224 which is movable with a switch arm 226. The switch arm 226 is operatively associated with the motor windings 228 of the reversible segmental drive motor 32, and is alternately engageable with a contact 230 and a contact 232 connected respectively with opposite ends of the windings 228. The windings 228 are arranged to drive the motor 32 in a direction to actuate the ratchet wheel 76 and impart a 90° movement to the chart 31 when the switch arm 226 is in engagement with the contact 232 and to drive the motor 32 in the opposite direction to reset the pawl 78 when the switch arm 226 is in engagement with the contact 230.

The cam 194 is, in this instance, provided with four dwells 234 which, when in engagement with the cam follower 224, will position the switch arm 226 in engagement with the contact 230. The raised portions of the cam 194 between the dwells 234 are shaped to position the switch arm 226 against the contact 232 when in engagement with the cam follower 224. Thus, for each rotation of the shaft 188 and cam 194, the motor 32 will cycle four times and will thus impart four angular increments of 90° to the chart 31 in the course of a single cycle of the selector switches 54, 56 during which each of the thermocouples 1 through 24 is scanned. It will be apparent that the result of this operation will be the printing of only six of the 24 records in each sector of the chart as shown in FIG. 1.

To summarize the overall operation of the apparatus hereinbefore described, the selector switches 54, 56, in cooperation with the cam actuated switch 204, 206, 208, sequentially connect the thermocouples 1 through 24 with the pen arm actuating device 36 to successively position the pen arm assembly 34 in angular positions relative to the chart 31 corresponding to conditions sensed by the thermocouples 1 through 24, the values of which are to be recorded. While this scanning operation and angular positioning of the pen arm assembly 34 is taking place, the motor 52 is periodically reciprocating the pen actuating shaft 108 relative to the chart 31 to index the marking turret and complete the printing operation, thereby sequentially recording the value of each condition as it is sensed by the thermocouples and transmitted to the pen arm actuating device 36. The chart 31 is continuously driven by the constant speed motor 30 at a uniform rate in a manner conventional in round-chart recorders. However, the reversible segmental drive motor 32 moves the chart 31 rapidly through an increment of 90° after each series of six printing operations to cause the records of only six conditions to be recorded on each quadrant of the chart 31.

The foregoing bank selection mechanism is particularly important in connection with multi-recorders for process controls utilizing numerous condition responsive signal generators. Where a great number of input variables are desired, it was formerly necessary, in order to quickly ascertain the condition of a process, to arrange the upper bridge so that at least two contacts were in contact with the bridge. Consequently, this "overlap" resulted in an average of the input variables present at the two or more contacts and it was impossible to determine and record the true input for each of the contacts and its respective condition responsive element.

In the present invention, at the instant that one of the switch arms 198, 214 overlaps a second contact, the switch arm 206 is moved to another position to connect the next condition responsive element with the actuating device 36. This permits continuous pure sampling of an input signal at a fixed rate of switch drive.

It will be apparent from the foregoing that the disclosed embodiment of the invention provides simplified mechanism for carrying out, in a single instrument, the multiple recording of a plurality of variables and accomplishes the objects of the invention. It will also be apparent to those skilled in the art that, although a single embodiment of the invention has been herein shown and described, various changes can be made in the details of construction and arrangement of parts without departing from the scope of the invention as defined in the appended claims.

It is claimed and desired to secure by Letters Patent:

1. A multi-record chart recorder for use with a chart having a plurality of recording areas, comprising in combination, means adapted for driving the chart at a substantially uniform rate of movement, recording means responsive to variations in a plurality of variable conditions and adapted for movement relative to the chart, a plurality of marking elements carried by said recording means, means responsive to a different one of said conditions for sequentially moving each of said marking elements into a position adapted for marking the chart within one of the recording areas in a series of marking operations, means cooperable with said driving means adapted for superimposing a limited movement at an increased rate on the moving chart upon completion of said series of marking operations to move the chart for contact with said marking elements in another of the recording areas.

2. In a multi-record circular chart recorder, the combination of rotatable means for driving a circular chart, means for rotating said driving means at a uniform rate, a recording member successively positionable over the chart to recording positions corresponding respectively with the values of variable conditions which are to be recorded, means for marking the chart to indicate thereon the successive recording positions of said recording member, means for periodically actuating said marking means to perform a marking operation, electrically operable means associated with said rotating means for said driving means for rotating said driving means and the chart movable thereby through a selected angular distance at an increased rate, switch means movable between positions for controlling said electrically operable means, and cam means driven by said actuating means for actuating said switch means upon completion of predetermined series of marking operations.

3. In a multi-record circular chart recorder, the combination of rotatable means for driving a circular chart, a recording member successively positionable over the chart to recording positions corresponding respectively with the values of variable conditions which are to be recorded, means for marking the chart to indicate thereon the successive recording positions of said recording member, a pinion gear connected to said driving means, a first planet gear meshing with said pinion gear, a sun gear, a second planet gear, meshing with said first planet gear and with said sun gear, means for revolving said second planet gear about said sun gear at a uniform rate to impart uniform rotational movement to said driving means and the chart movable thereby, and means for periodically advancing said sun gear through a predetermined angular distance to impart rotational movement to said driving means at an increased rate.

4. A multi-record circular chart recorder as claimed in claim 3 wherein said last named means includes control means for advancing said sun gear upon completion of predetermined series of marking operations.

5. A multi-record circular chart recorder as claimed in claim 4 and including a ratchet wheel operatively connected to said sun gear to rotate therewith, a first pawl for preventing movement of said ratchet wheel in one direction, a second pawl adapted for limited angular movement about the axis of said ratchet wheel and being operatively engageable therewith for driving the same in another direction, and reversible motor means for moving said second pawl between the limits of said angular movement.

6. In a multi-record circular chart recorder, the combination of rotatable means for driving a circular chart, means for rotating said driving means at a uniform rate, a recording member successively positionable over the chart to recording positions corresponding respectively with the values of variable conditions which are to be recorded, a plurality of marking elements movable with said recording member and selectively engageable with the chart, means for sequentially moving said marking elements into marking engagement with the chart, means including said rotating means for said driving means for rotating said driving means through a selected angular distance at an increased rate, and means for periodically actuating said last named means upon the completion of at least one marking operation by each of said marking elements.

7. A multi-record recording instrument comprising a recording member successively positionable over a chart to recording positions corresponding respectively with the values of variable conditions which are to be recorded, a plurality of marking elements movable with said recording member and selectively engageable with the chart, means for reciprocating said recording member toward and away from the chart, means responsive to reciprocable movement of said recording member for imparting limited rotational movement thereto to thereby move one of said marking elements out of registry with the chart and another one of said marking elements into registry therewith, means for rotating said driving means at a uniform rate, means including said rotating means for said driving means for rotating said driving means through a selected angular distance at an increased rate, and means for periodically actuating said last named means upon the completion of at least one marking operation by each of said marking elements.

8. A multi-record recording instrument as claimed in claim 7 wherein said last named means includes switch means, and cam means for actuating said switch means, said cam means being operatively connected to said means for reciprocating said recording member.

9. A multi-record recording instrument comprising a pivoted member successively positionable over a chart to angular recording positions corresponding respectively with the values of variable conditions which are to be recorded, a pen arm having a plurality of angularly spaced marking elements at one end thereof, yieldable means for biasing said one end away from said member and the chart, an indexing plate on the other end of said pen arm and having a plurality of surfaces engageable with said member for controlling the positions of said marking elements relative to said pivoted member, means responsive to lateral movement of said pen arm relative to said pivoted member for imparting limited rotation to said pen arm, and adjustable means pivotally connected to said pen arm intermediate said ends for reciprocating said pen arm laterally of said pivoted member to move said indexing plate out of and then into engagement with said member and thereafter for moving the said one end of said pen arm laterally against the bias of said yieldable means to move one of said marking elements into engagement with the chart whereby said adjustable means determines the arc described by said pen arm to control the printing pressure of said marking element on said chart.

10. A multi-record recording instrument as claimed in claim 9 wherein said yieldable means comprises a leaf spring secured to said pivoted member and operatively engageable with said one end of said pen arm.

11. A multi-record recording instrument as claimed in claim 10 wherein said leaf spring carries a plate having a V-shaped groove therein for the reception of said pen arm, the apex of said groove overlying and pointing toward the centerline of said pivoted member for accurately positioning said pen arm relative to said centerline.

12. A multi-record recording instrument comprising a pivoted member successively positionable over a chart to angular recording positions corresponding respectively with the values of variable conditions which are to be recorded, a pen arm having a plurality of angularly spaced marking elements at one end thereof, yieldable means for biasing said one end away from said pivoted member and the chart, an indexing plate on the other end of said pen arm and having a plurality of surfaces engageable with said member for controlling the positions of said marking elements relative to said pivoted member, means responsive to lateral movement of said pen arm relative to said pivoted member for imparting limited rotation to said pen arm, a self-aligning bearing, said pen arm being journaled in said bearing at a point intermediate said ends, a plunger pivotally connected to said bearing, and means for periodically reciprocating said plunger for reciprocating said pen arm laterally of said pivoted member to move said indexing plate out of and then into engagement with said member and thereafter overcoming said yieldable means to move one of said marking elements into engagement with the chart.

13. A multi-record recording instrument comprising a pivoted member successively positionable over a chart to angular recording positions corresponding respectively with the values of variable conditions which are to be recorded, a pen arm having a plurality of angularly spaced marking elements at one end thereof, an indexing plate on the other end of said pen arm and having a plurality of surfaces engageable with said member for controlling the positions of said marking elements relative to said pivoted member, means responsive to lateral movement of said pen arm relative to said pivoted member for imparting limited rotation to said pen arm, a plunger disposed along said axis of said pivoted member, means for periodically reciprocating said plunger, a yoke pivotally connected to said plunger, a bearing mounted in said yoke, said pen arm being journaled in said bearing, and means for adjusting said bearing relative to said yoke and axially of said plunger for adjusting the printing pressure applied by said marking elements upon reciprocation of said plunger.

14. A multi-record recording instrument as claimed in claim 13 wherein said yoke is provided with adjustable abutment means, and means for biasing said bearing into operative engagement with said abutment means.

References Cited in the file of this patent

UNITED STATES PATENTS

| | | |
|---|---|---|
| 1,136,648 | Bristol | Apr. 20, 1915 |
| 2,118,081 | Grisdale | May 24, 1938 |
| 2,125,345 | Hunt | Aug. 2, 1938 |
| 2,414,221 | Bristol | Jan. 14, 1947 |
| 2,425,080 | Blakeslee | Aug. 5, 1947 |
| 2,627,755 | Hooker | Feb. 10, 1953 |
| 2,743,986 | Bradner | May 1, 1956 |
| 2,778,711 | Fielden | Jan. 22, 1957 |

FOREIGN PATENTS

| | | |
|---|---|---|
| 517,912 | Belgium | Feb. 24, 1953 |